United States Patent [19]

Jones

[11] Patent Number: 5,258,748
[45] Date of Patent: Nov. 2, 1993

[54] ACCESSING AND SELECTING MULTIPLE KEY FUNCTIONS WITH MINIMUM KEYSTROKES

[75] Inventor: Robert W. Jones, Corvallis, Oreg.

[73] Assignee: Hewlett-Packard Company, Palo Alto, Calif.

[21] Appl. No.: 751,368

[22] Filed: Aug. 28, 1991

[51] Int. Cl.$^5$ ............................................. G09G 3/02
[52] U.S. Cl. .............................. 345/172; 364/709.14; 341/23
[58] Field of Search ............... 340/711, 712, 706, 726, 340/724; 341/22, 23; 364/709.16, 709.14, 709.15, 710.07

[56] References Cited

U.S. PATENT DOCUMENTS

| | | |
|---|---|---|
| 4,202,038 | 5/1980 | Petersson . |
| 4,718,029 | 1/1988 | Morino et al. ................. 364/710.08 |
| 4,823,311 | 4/1989 | Hunter et al. .................. 364/709.14 |
| 5,007,008 | 4/1991 | Beers ............................... 364/709.16 |
| 5,020,012 | 5/1991 | Stockberger et al. .......... 364/709.14 |
| 5,134,577 | 7/1992 | Kawawaki ..................... 364/709.16 |

Primary Examiner—Alvin E. Oberley
Assistant Examiner—Chanh Nguyen

[57] ABSTRACT

A calculating device and related method for accessing and selecting among multiple key functions with a minimum of keystrokes. The keyboard includes menu keys corresponding to menu labels displayable on the display and a multi-function key having a primary function and a secondary function. Which of the key functions is selected depends on the duration of the key press. The calculating device executes the primary function if the key is pressed for a short time. However, if the key is pressed for longer than a given time period, the calculating device displays a set of menu labels and assigns a function associated with a displayed menu label to a menu key. If the key continues to be pressed, the display scrolls to show additional sets of menu labels. A menu function may then be selected by releasing the multi-function key and pressing the appropriate menu key.

17 Claims, 2 Drawing Sheets

ACCESSING AND SELECTING MULTIPLE KEY FUNCTIONS WITH MINIMUM KEYSTROKES

BACKGROUND OF THE INVENTION

This invention relates to calculating devices such as hand-held calculators and computers. More particularly, this invention relates to method and apparatus for accessing and selecting any function in the calculating device in two keystrokes.

Prior calculators and other devices that have dedicated function keys have faced a dilemma. As these devices have progressed, they have offered more functions on a limited number of keys. Each key is thus used for several functions, typically up to four per key. A multi-function key may have a primary function, i.e., the function executed by simply pressing the key, as well as a number of secondary, shifted functions. The shifting may be accomplished in a number of way. A common technique is key-based shifting, where a shift key is pressed prior to pressing the function key. Another technique is time-based shifting, where a multi-function key is pressed until the desired function is indicated and the key is then released to execute the function. A third technique is pattern-based, where the number of key presses within a predetermined time period determines which function is executed.

These shifting techniques have allowed more functions to be added to a key, but the increased functions have made use of the keys increasingly difficult. The symbols representing the key's functions must be somehow placed about the key and recognized by the user as to how they are reached. For example, in U.S. Pat. No. 4,202,038, the key's functions are placed directly on the key face. This requires, however, that the keys be relatively large and limited in number. Therefore, as a practical matter, the number of symbols that can be placed adjacent a key is about four.

Limiting the number of functions a calculating may perform, however, may unacceptably limit the performance of the device. More keys may be added, but this requires either a larger keyboard (limiting portability) or smaller keys (limiting ease of use).

The present invention offers an alternative whereby the functions associated with a key are not limited to those that can be displayed adjacent to the key, and yet each key function can be executed with no more than two key presses.

SUMMARY OF INVENTION

An object of the invention, therefore, is to provide access and selection of any key function of a calculator or similar device with two keystrokes.

Another object of the invention is to provide such access and selection with a set of menu labels that periodically change as a key remains pressed.

Yet another object of the invention is to provide such access and selection from a multi-function key that includes a primary function that is selected if the key is released before a given time period.

To achieve these objects a calculating device according to the invention includes a display, keyboard and data processor equipped to provide the required functionality. The keyboard includes menu keys corresponding to menu labels displayable on the display and a multi-function key having a primary function and a secondary function. The key function selected depends on the duration the multi-function key is pressed. Coupled to the display and keyboard is means such as a data processor that executes the primary key function if the key is pressed for less than a first time period. If pressed for greater than that time, the data processor displays a set of menu labels corresponding to the secondary function. It also assigns a function associated with each displayed menu label to a menu key. A menu key may then be pressed to select a function. Thus, only two keystrokes are required to access and select a key function from a multiple of key functions.

In one feature of the invention, a subsequent set of menu labels is displayed if the multi-function key remains pressed additional second time periods. With a limited number of sets per key, the first label set wraps around and is re-displayed so that a user may scroll through the menu label sets before selecting a function by pressing a menu key.

The foregoing and other objects, features, and advantages of the invention will become more apparent from the following detailed description of a preferred embodiment which proceeds with reference to the accompanying drawings.

DETAILED DESCRIPTION

Figure 1:
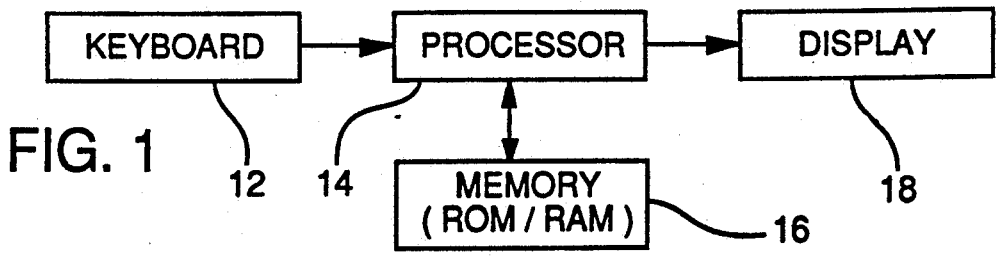
FIG. 1 is a functional block diagram of a calculating device such as a calculator in which the invention may be incorporated.

Referring now to the drawings, FIG. 1 is a block diagram of a calculating device such as a calculator in which the present invention may be incorporated. The device includes a keyboard 12 that communicates with a data processor such as a microprocessor 14 to transmit data, key functions and other instructions to be performed. The microprocessor 14 also communicates with memory 16 in which programs are stored for operating the calculating device, including a program which is one embodiment of the present invention. Memory 16 may include either ROM, RAM or other equivalent memory depending on the design of the calculating device. Data from the microprocessor 14 is transmitted to an output device such as display 18. The output device may be a CRT-, LED-, or LCD-based display, or equivalent.

Figure 2:
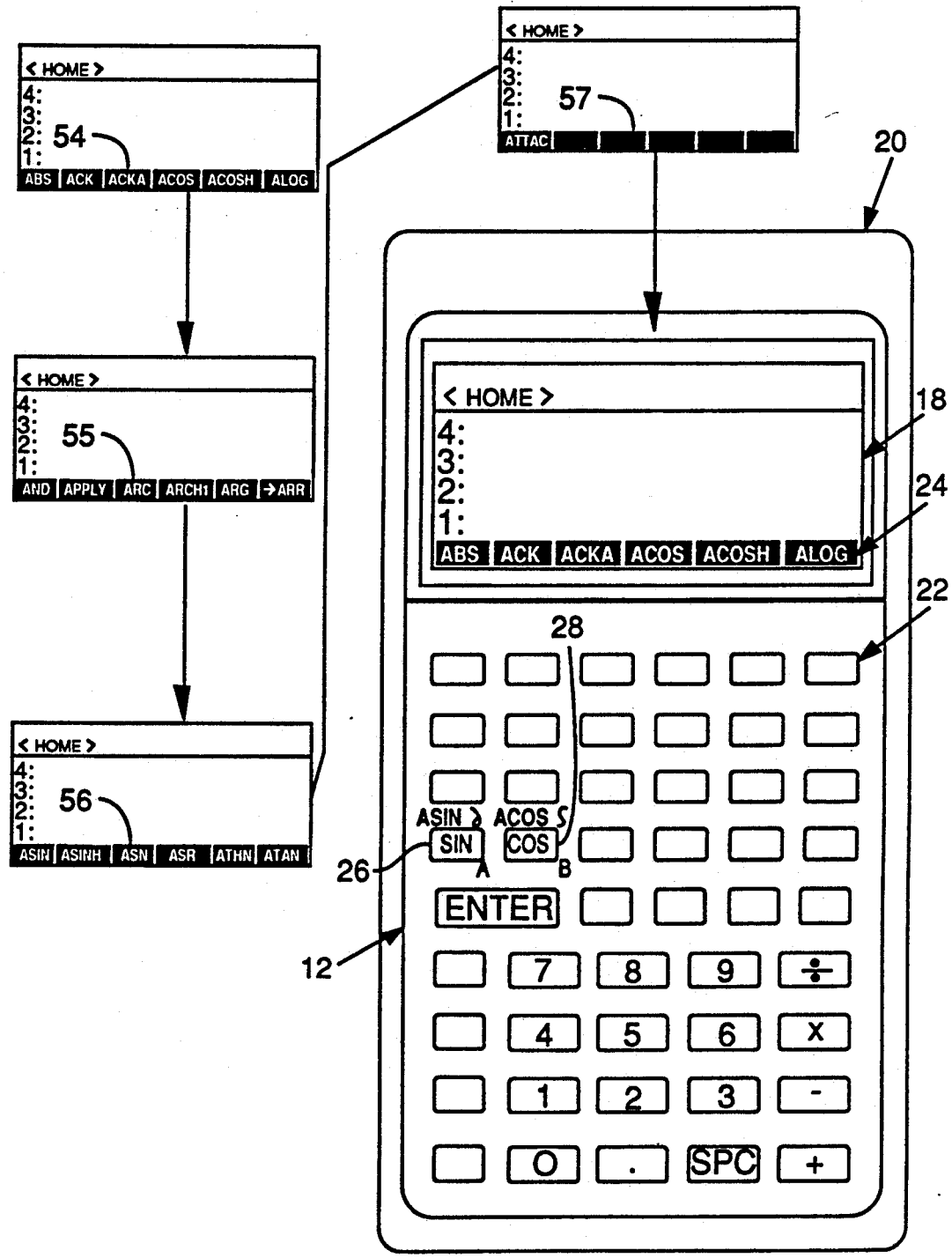
FIG. 2 is a front view of a calculator in which the invention may be incorporated, including a series of screen displays.

FIG. 2 is a front view of a calculator 20 that includes apparatus and method according to the invention. For clarity, the same numerals are used in FIGS. 1 and 2 to illustrate associated parts. On the face of the calculator 20 is a keyboard 12 that includes a row of menu keys 22. Above the keyboard 12 on the face of calculator 20 is an LCD display 18. Shown within the display 18 immediately above menu keys 22 is a set of menu labels 24 that represent functions assigned to the keys 22. As will be described, the menu labels displayed are a function of the menu selected. With the calculator 20 turned on, menu labels 24 may be visible on the display 18 if an appropriate key has been pressed. Also included on keyboard 12 are a number of multi-function keys such as 'sin' key 26 and 'cos' key 28 shown here for illustration. A multi-function key is one that has multiple functions associated with the key. The function on the face of the key, such as 'sin' on key 26, is the primary function, and is executed by simply pressing the key. The other functions, such as 'asin' and 'A' or 'partial derivative,' are secondary functions and require shifting as will be described to execute the function. Also shown in FIG. 2 is a series of screen displays on display 18, to be described, that show various sets of related menu labels. The labels represent different calculator functions associated with a secondary function of a multi-function key. The term 'function' is used broadly here to include mathematical functions, commands, operations, etc. that are performed on data.

Figure 3:
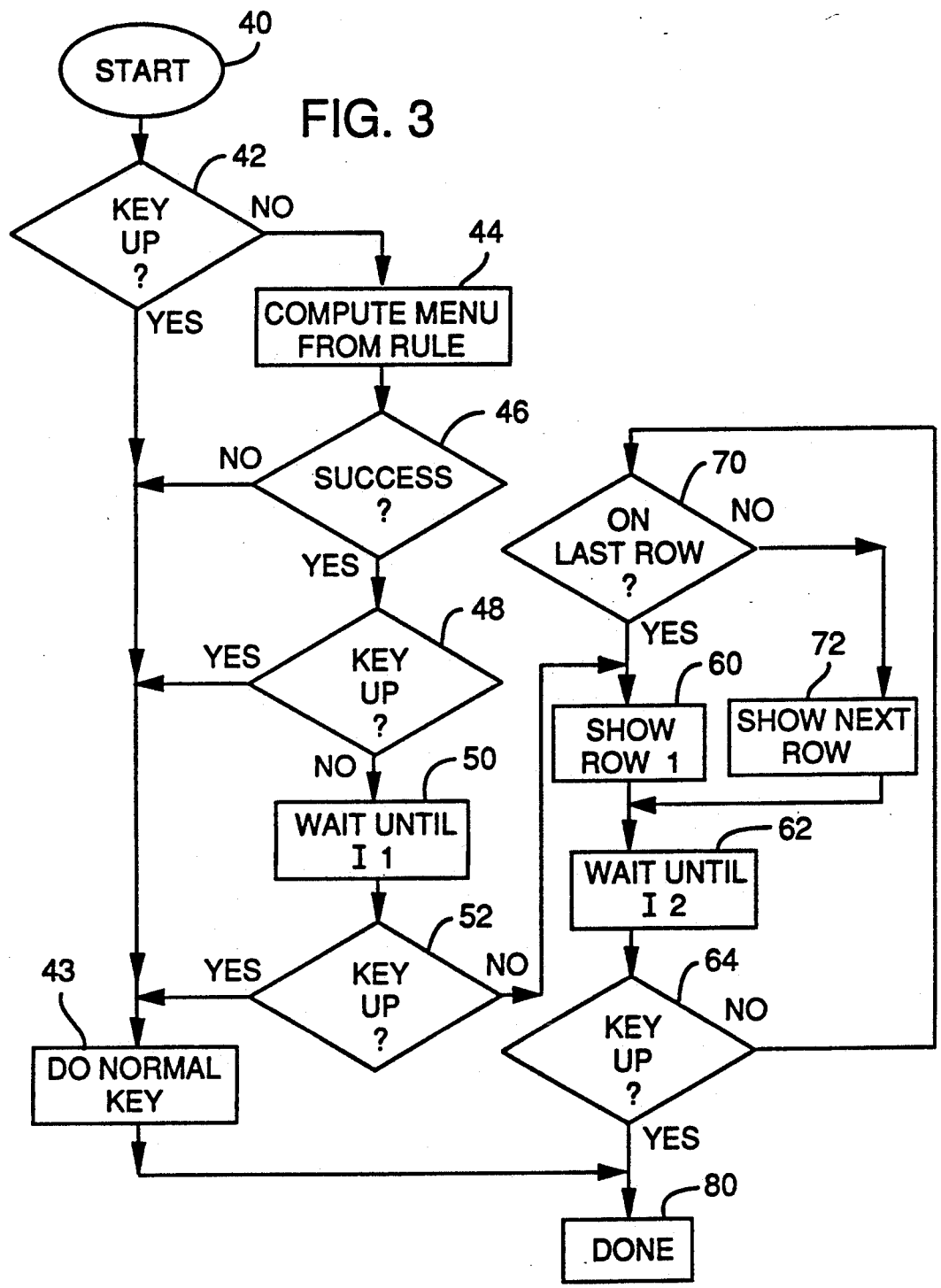
FIG. 3 is a flowchart illustrating one method of operation according to the invention.

FIG. 3 is a flowchart of a program that controls the operation of calculator 20 according to the invention. The program in the present embodiment is contained in memory 16 of the calculator and controls the calculator 20 by directing the operation of the microprocessor 14. It will be understood in the art that a hardware equivalent to the program embodiment of the invention may be employed if desired. However, a software embodiment is preferred because of its ease of implementation, testing and adaptability.

In FIG. 3, each step in the method is referred to herein by a number in parentheses. For example, the program is started (40) whenever a multi-function key is pressed. Once started, the program checks to determine if the key is pressed for more than a nominal time (42). If not, the program executes the primary function of the key, such as computing the cosine for key 28 (43). On the other hand, if the multifunction key is pressed for greater than the nominal time, the program determines if a group of menu labels is associated with the multi-function key that is pressed (44). For key 28, there is such a group comprising in this example all menu labels that begin with the letter 'A', divided into pages or sets of six labels each. If the determination is not successful (no labels exist) (46), the program branches to execute the primary key function defined for the key (43). If, however, the program determines that menu labels do exist for the key, it will check to determine to see if the key is still pressed (48). If so, it waits a first (and optionally adjustable) time period I1 (50) and checks again if the key is still pressed (52). If the key is not pressed at the end of I1, the program branches to execute the primary function (43).

Referring also now to FIG. 2, assume that the multi-function key, such as key 28, remains pressed past the first time period. This will cause a first set 54 of menu labels which begin with the letter 'A' to be displayed on the display 18 (60). The program then waits an additional second time period I2 while the set of menu labels is displayed (62). During this time, the user may freeze the display of the menu labels by releasing the key (64). This causes the program to terminate (80) with the set of labels displayed on display 18. The user may then execute a function by selecting and pressing a second key. In this case, the second key is a menu key associated with the label representing the desired function. Alternatively, a user can clear the display by pressing a key having that function (not shown).

If the multi-function key remains pressed (64), however, the program will show another set of labels in display 18 if such a set exists. First, the program checks if the set of menu labels currently being displayed is the last in the group (70). If not, the program displays the next set of menu labels (72) and again waits the additional second time period (62). In FIG. 2, this causes the display of a second set 55 of labels, each which also begins with the letter 'A'. The program then checks if the key (such as key 28) remains pressed. The user may select a function from set 55 by releasing key 28 and pressing one of the menu keys (64, 80). So long as key 28 remains pressed, however, this scrolling process repeats to display set 56 and set 57 of menu labels. The program determines that set 57 is the last set of the group (70) and redisplays set 54 (60). The label sets are then repeatedly displayed, cyclical fashion, until the user releases the multi-function key. At any point where the key 28 is released, the program terminates and displays the current set of menu labels for selection of a menu key or until cleared.

With this technique, a user may execute any function of a calculator by pressing no more than two keys. First, he presses a multi-function key such as key 26 or key 28. By pressing key 28 for sufficient time, the key shifts to execute its secondary function of displaying groups of menu labels. By then continuing to press the multi-function key, different sets of menu labels are displayed until the user releases the key. The user then selects the desired function by pressing the menu key associated with the label representing the function.

Having illustrated and described the principles of the invention in a preferred embodiment, it should be apparent to those skilled in the art that the invention can be modified in arrangement and detail without departing from such principles. For example, the illustration embodiment is that of a calculator, but the invention could well be incorporated into a hand-held computer or other small computing device. I claim all modifications coming within the spirit and scope of the following claims.

I claim:

1. A calculating device comprising:
a display;
a keyboard including menu keys corresponding to menu labels displayable on the display and a multi-function key having a primary function and a secondary function, the function selected depending on the duration the multi-function key is pressed; and
a data processor coupled to the keyboard and the display for:
(a) executing the primary key function if the multi-function key is pressed for less than a first time period;
(b) displaying on the display a set of at least two menu labels corresponding to the secondary function if the multi-function key remains pressed for greater than the first time period, each of said at least two labels being displayed at the same time and representing an associated function;
(c) assigning the function associated with each displayed menu label to the corresponding menu key; and
(d) executing the associated function if the menu key is pressed.

2. The calculating device of claim 1 wherein the data processor displays on the display a second set of menu labels if the multi-function key remains pressed for greater than a second time period, the data processor then assigning a function associated with a menu label in the second set to a menu key.

3. The calculating device of claim 2 wherein the data processor repeatedly displays on the display successive sets of menu labels, a displayed label set successively changing if the multi-function key remains pressed.

4. The calculating device of claim 1 wherein each menu key corresponds to a menu label displayed directly above the key on the display.

5. The calculating device of claim 1 wherein the secondary function of the multi-function key is represented on the keyboard as a letter and the corresponding menu labels represent functions whose names begin with the letter.

6. The calculating device of claim 1 wherein the first and second time periods are of different lengths.

7. The calculating device of claim 1 wherein the display is a liquid crystal display.

8. The calculating device of claim 1 wherein the first time period of adjustable.

9. The calculating device of claim 1 wherein the second time period is adjustable.

10. A calculating device comprising:
    a display;
    a keyboard including menu keys corresponding to menu labels displayable on the display and a multi-function key having a primary function and a secondary function, the function selected depending on the duration the multi-function key is pressed; and
    processing means for:
    (a) executing the primary key function if the multi-function key is pressed for less than a first time period;
    (b) displaying on the display a set of at least two menu labels corresponding to the secondary function if the multi-function key remains pressed for greater than the first time period, each of said at least two labels being displayed at the same time and representing an associated function;
    (c) displaying a subsequent set of menu labels if the multi-function key remains pressed for greater than a second time period;
    (d) assigning the function associated with each displayed menu label to the corresponding menu key; and
    (e) executing the associated function if the menu key is pressed.

11. The device of claim 10 wherein the processing means redisplays the first set of menu labels if the multi-function key remains pressed an additional second time period.

12. In a calculating device having a display and a keyboard with menu keys, a method of selecting among multiple key functions, comprising:
    providing a multi-function key having a primary function and a secondary function;
    executing the primary key function if the multi-function key is pressed for less than a first time period;
    displaying a set of at least two menu labels corresponding to the secondary function if the multi-function key remains pressed for greater than the first time period, each of said at least two labels being displayed at the same time and representing an associated function
    assigning the function associated with each displayed menu label to a menu key; and
    executing the associated function if the menu key is pressed.

13. The method of claim 12 including displaying a second set of menu labels if the multi-function key remains pressed for greater than a second time period and assigning the function associated with each menu label in the second set to a menu key.

14. The method of claim 13 including repeatedly displaying successive sets of menu labels, a displayed menu label set changing if the multi-function key remains pressed.

15. The method of claim 13 wherein the first set of menu labels is re-displayed if the multi-function key remains pressed for the greater than the second time period.

16. The method of claim 12 wherein the first time period is adjustable.

17. The method of claim 12 wherein the second time period is adjustable.

* * * * *